United States Patent
Gukal et al.

(10) Patent No.: US 9,311,569 B2
(45) Date of Patent: Apr. 12, 2016

(54) STATE BASED ADAPTIVE COMPRESSION OF PERFORMANCE TRACES

(71) Applicant: CA, INC., Islandia, NY (US)

(72) Inventors: Sreenivas Gukal, Santa Clara, CA (US); Sanjay Vyas, Fremont, CA (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/471,444

(22) Filed: Aug. 28, 2014

(65) Prior Publication Data

US 2016/0063356 A1    Mar. 3, 2016

(51) Int. Cl.
*G06K 9/62*    (2006.01)
*G06T 7/00*    (2006.01)
*G06K 9/52*    (2006.01)
*G06F 17/15*   (2006.01)

(52) U.S. Cl.
CPC .............. *G06K 9/6267* (2013.01); *G06F 17/15* (2013.01); *G06K 9/52* (2013.01); *G06T 7/0093* (2013.01)

(58) Field of Classification Search
CPC .............. G06T 7/0081; G06T 7/0083; G06T 2207/10016; G06T 2207/20144; G06T 7/0093; G06T 9/6267
See application file for complete search history.

(56) References Cited

U.S. PATENT DOCUMENTS

| | | | | |
|---|---|---|---|---|
| 5,926,567 A * | 7/1999 | Collins | ................. | G06T 11/203 345/428 |
| 6,141,454 A * | 10/2000 | Seymour | .................. | G06T 9/20 382/108 |
| 6,195,445 B1 * | 2/2001 | Dubuisson-Jolly | .. | G06K 9/3216 382/107 |
| 6,259,802 B1 * | 7/2001 | Jolly | ..................... | G06T 7/2033 382/103 |
| 6,438,266 B1 * | 8/2002 | Bajaj | ....................... | G06T 9/001 382/154 |
| 7,430,340 B2 * | 9/2008 | Glass | ................... | G09B 29/106 382/232 |
| 7,668,386 B2 * | 2/2010 | Beatty | ...................... | G06T 9/00 382/197 |

OTHER PUBLICATIONS

Charng-da Lu; "Compact Application Signatures for Parallel and Distributed Scientific Codes," Department of Computer Science, University of Illinois, Copyright 2002 IEEE, 10 pages.

* cited by examiner

*Primary Examiner* — Amir Alavi (74) *Attorney, Agent, or Firm* — Myers Bigel & Sibley, P.A.

(57) ABSTRACT

A method by a computer includes generating polylines based on a sequence of values contained in performance trace data from a software source on a host machine node. Segments of the polylines are generated. Separate ones of the segments are categorized based on patterns of the polylines of the separate ones of the segments. For the separate ones of the segments, compressed data is generated that approximates values contained in the performance trace data corresponding to the polylines of the segment while regulating a level of fidelity of the approximations based on the categorization of the segment. The compressed data is stored in a log repository.

20 Claims, 6 Drawing Sheets

STATE BASED ADAPTIVE COMPRESSION OF PERFORMANCE TRACES

TECHNICAL FIELD

The present disclosure relates to computer systems and more particularly to storage of performance traces from computer equipment.

BACKGROUND

Data centers can contain thousands of servers (both physical and virtual machines), with each server running one or more software applications. The servers and software applications generate performance traces indicating their present states and operations. For example, software applications may output performance traces that sequentially list actions performed and application state information at various checkpoints or when triggered by defined performances (e.g., faults) occurrences, etc.

A performance trace can be a continuous set of ordered pairs <T, V>, where T is the timestamp when the value V is observed by a trace generator. The rate at which a trace is generated can be high for critical software/hardware components. Moreover, the cumulative amount of data generated by traces from a data center can be large.

Data from performance traces are stored in trace logs. The performance traces that are recent are usually kept temporarily memory, while only the summaries and statistics of older performance traces are permanently saved. This results in two issues. First, the system needs to have sufficient network and processing bandwidth to generate the summaries and statistics and have sufficient storage capacity to handle the performance traces at peak rates and volume. Second, a loss of fidelity of the information results when older performance traces are replaced by the summaries and statistics generated therefrom.

SUMMARY

Some embodiments disclosed herein are directed to a method by a computer. The method includes generating polylines based on a sequence of values contained in performance trace data from a software source on a host machine node. Segments of the polylines are generated. Separate ones of the segments are categorized based on patterns of the polylines of the separate ones of the segments. For the separate ones of the segments, compressed data is generated that approximates values contained in the performance trace data corresponding to the polylines of the segment while regulating a level of fidelity of the approximations based on the categorization of the segment. The compressed data is stored in a log repository.

Some other embodiments disclosed herein are directed to a computer program product that includes a computer readable storage medium having computer readable program code embodied therewith. The computer readable program code includes computer readable program code that generates polylines based on a sequence of values contained in performance trace data from a software source on a host machine node. Further computer readable program code generates segments of the polylines, and categorizes separate ones of the segments based on patterns of the polylines of the separate ones of the segments. Further computer readable program code operates to, for the separate ones of the segments, generate compressed data that approximates values contained in the performance trace data corresponding to the polylines of the segment while regulating a level of fidelity of the approximations based on the categorization of the segment. Further computer readable program code stores the compressed data in a log repository.

It is noted that aspects described with respect to one embodiment may be incorporated in different embodiments although not specifically described relative thereto. That is, all embodiments and/or features of any embodiments can be combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Figure 1:
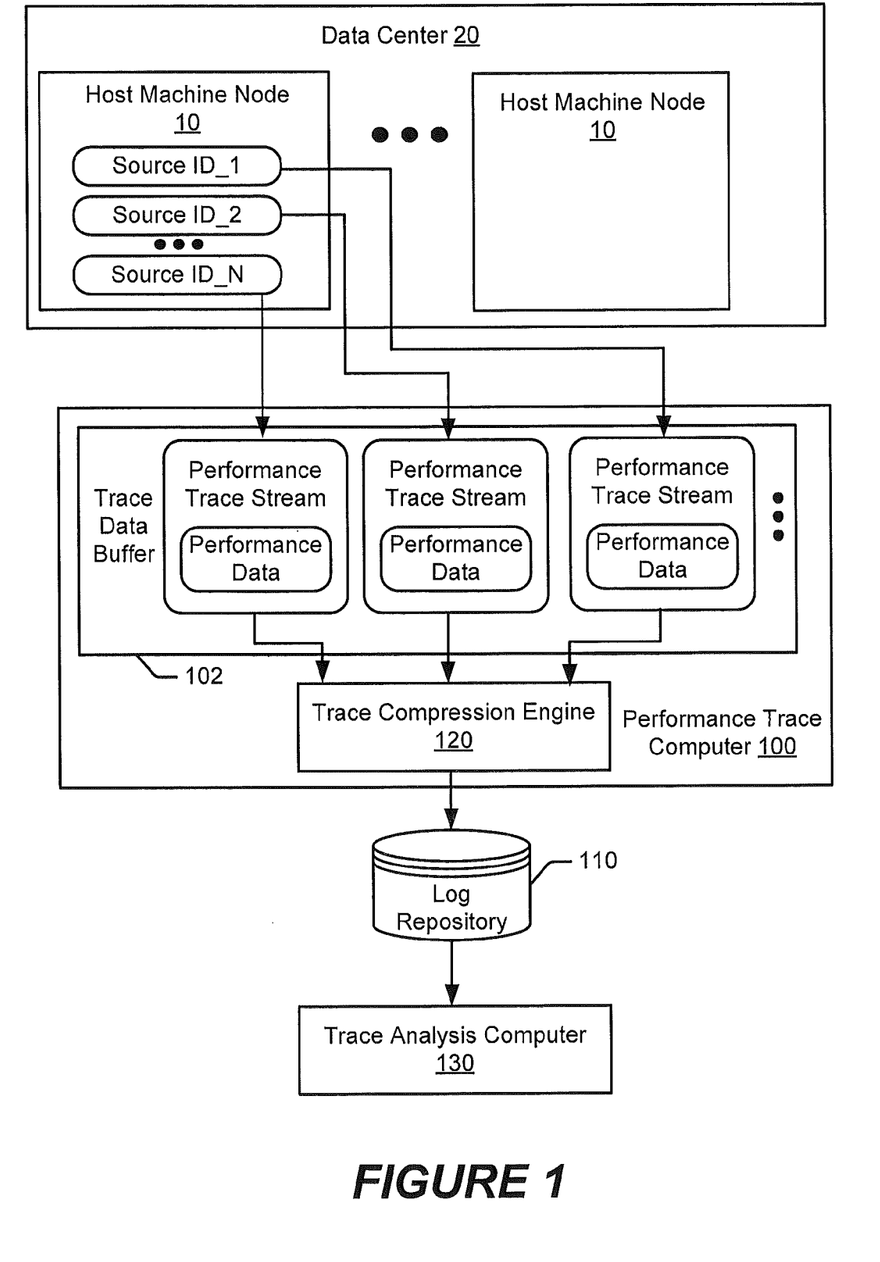
FIG. 1 is a block diagram of a system containing a performance trace computer that compresses performance trace data from performance trace streams in accordance with some embodiments.

Some embodiments are disclosed herein in the context of the nonlimiting example system in FIG. 1 having a data center 20 that outputs performance trace streams containing performance trace data ("performance data" for brevity) to a performance trace computer 100 that compresses the performance trace data for storage in a log repository 110. A trace analysis computer 130 analyzes the compressed data in the log repository 110 to analyze operations of the data center 20. For example, the trace analysis computer 130 may determine utilization and performance of software and/or hardware resources of the data center 20 and identify the occurrence and root causes of faults and errors therewith.

In the embodiment of FIG. 1, the performance trace computer 100 receives performance trace streams from N different software sources (identified as Source ID_1, Source ID_2, . . . Source ID_N) executed by the host machine node 10. The performance trace data received in the performance trace streams can be temporarily stored in a trace data buffer 102 (e.g., solid-state random access memory and/or data server(s)).

A host machine node 10 can include a physical host machine and/or a virtual machine (VM). The host machine node 10 is also referred to as a "host node" and "host" for brevity. The physical host machine includes circuitry that performs computer operations to execute one or more software sources. The physical host machine may include, without limitation, network content servers (e.g., Internet website servers, movie/television programming streaming servers, application program servers), network storage devices (e.g., cloud data storage servers), network data routers, network gateways, communication interfaces, program code processors, data memories, display devices, and/or peripheral devices. The physical host machine may include computer resources such as: processor(s), such as a central processing unit (CPU); network interface(s); memory device(s); mass data storage device(s), such as disk drives, solid state non-volatile memory, etc.; etc.

A physical host machine can provide one or more VMs that execute one or more software sources. A virtual hypervisor can provide an interface between the VMs and a host operating system that allows multiple guest operating systems and associated software sources to run concurrently on a physical host machine. The host operating system is responsible for the management and coordination of activities and the sharing of the computer resources of the physical host machine.

Each software source belongs to a source type. For example, a "SQL Server" may be a source type and each installation of SQL Server is a software source belonging to the source type. Multiple sources of the same or different source types may be on the same host, and a software source may migrate between hosts. Each host and software source may be identified by a unique identifier, Host ID and Source ID respectively. A performance trace stream (generated by a software source of a particular host 10) can be uniquely identified by a compound identifier generated from combination of the Host ID and Source ID.

The performance trace computer 100 can receive a sequence of performance trace data in each of the performance trace streams. The performance trace data may contain defined metrics which are indicative of utilization and/or performance of software and/or hardware resources of the data center 20. For example, the performance trace data may identify processor utilization, memory utilization, network bandwidth utilization, communication latency, mass storage utilization, operation traces, and/or operational faults.

Each instance of the performance trace data may contain an ordered pair <T, V>, where T is the timestamp when a value V was observed by a trace generator which generated the performance trace stream. The trace generator may include software within or separate from the software sources. The rate at which the performance trace data is received may vary over time based on operational performances occurring within the software source and/or the host machine node 10.

Because of the potentially large quantity and rate of performance trace data that can be received from the data center 20, it can be important for the performance trace computer 100 to be able to output compressed data that approximates the performance trace data but is significantly compressed relative thereto. However, it may also be important to preserve a relatively high level of fidelity with which the compressed data approximates the performance trace data. High fidelity can enable more detailed and/or accurate analysis to be performed by the trace analysis computer 130 using the compressed data in the log repository 110.

Compression of performance trace data can create a significant overhead on the trace compression engine 120 because of the quantity and/or rate of receipt of performance trace data in a performance trace stream. As will be explained in further detail below, compression of the performance trace data is performed based on identifying patterns in the performance trace data, categorizing segments of the performance trace data based on the patterns, and regulating a level of fidelity of the approximations during the compression based on the categorization.

Figure 2:
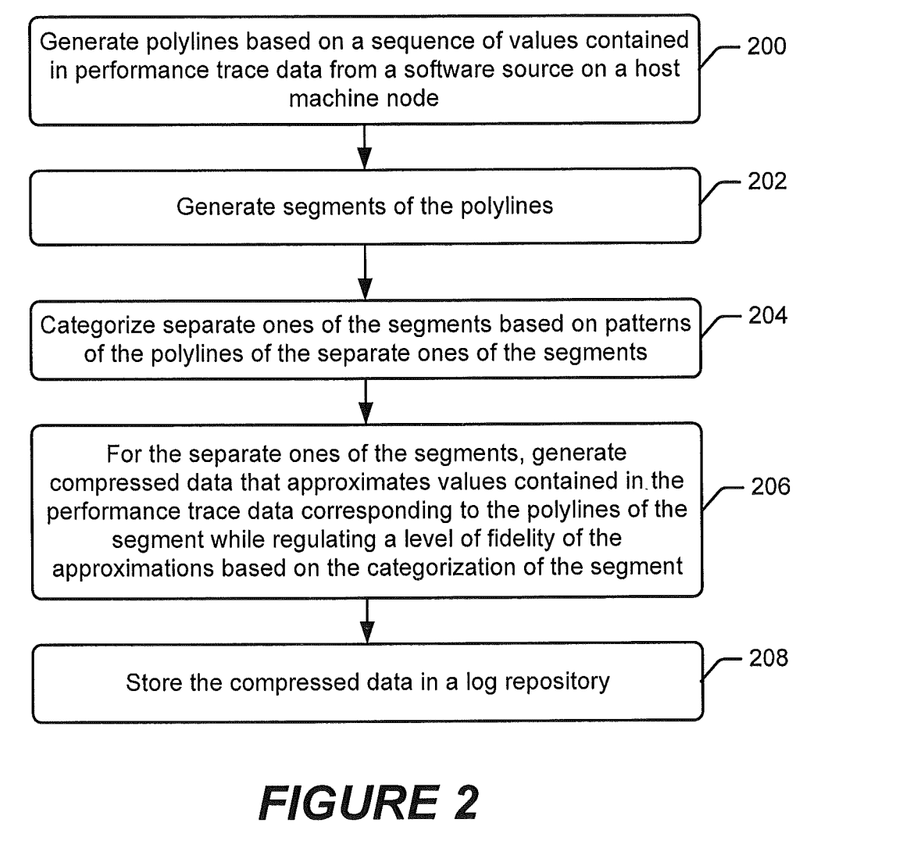
FIG. 2 is a flowchart of operations by a trace compression engine of a performance trace computer for compressing trace data from performance trace streams in accordance with some embodiments.
Figure 3A:
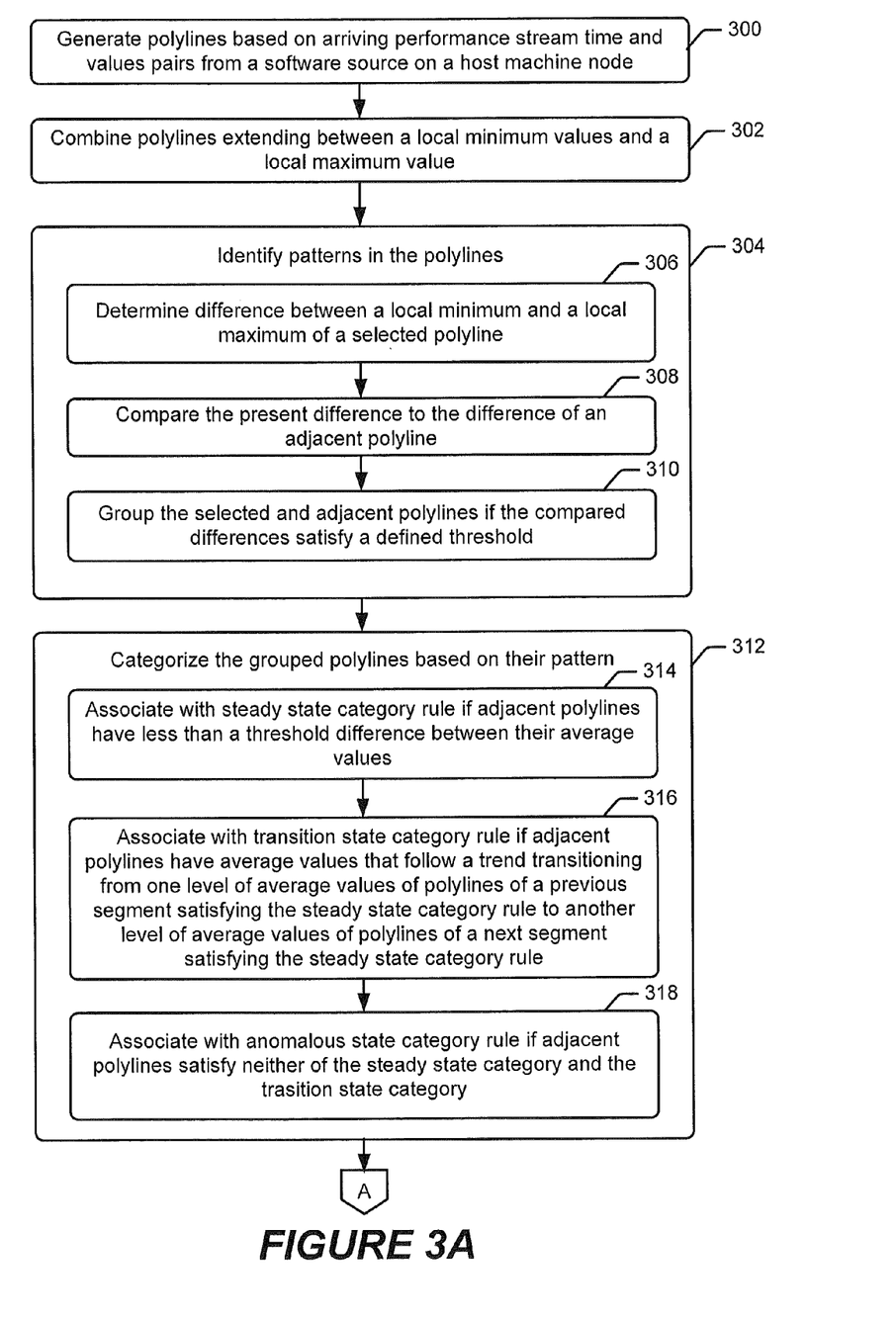
FIGS. 3A and 3B are connected flowcharts illustrated further operations by a trace compression engine of a performance race log computer for compressing trace data from performance trace streams in accordance with some embodiments.
Figure 3B:
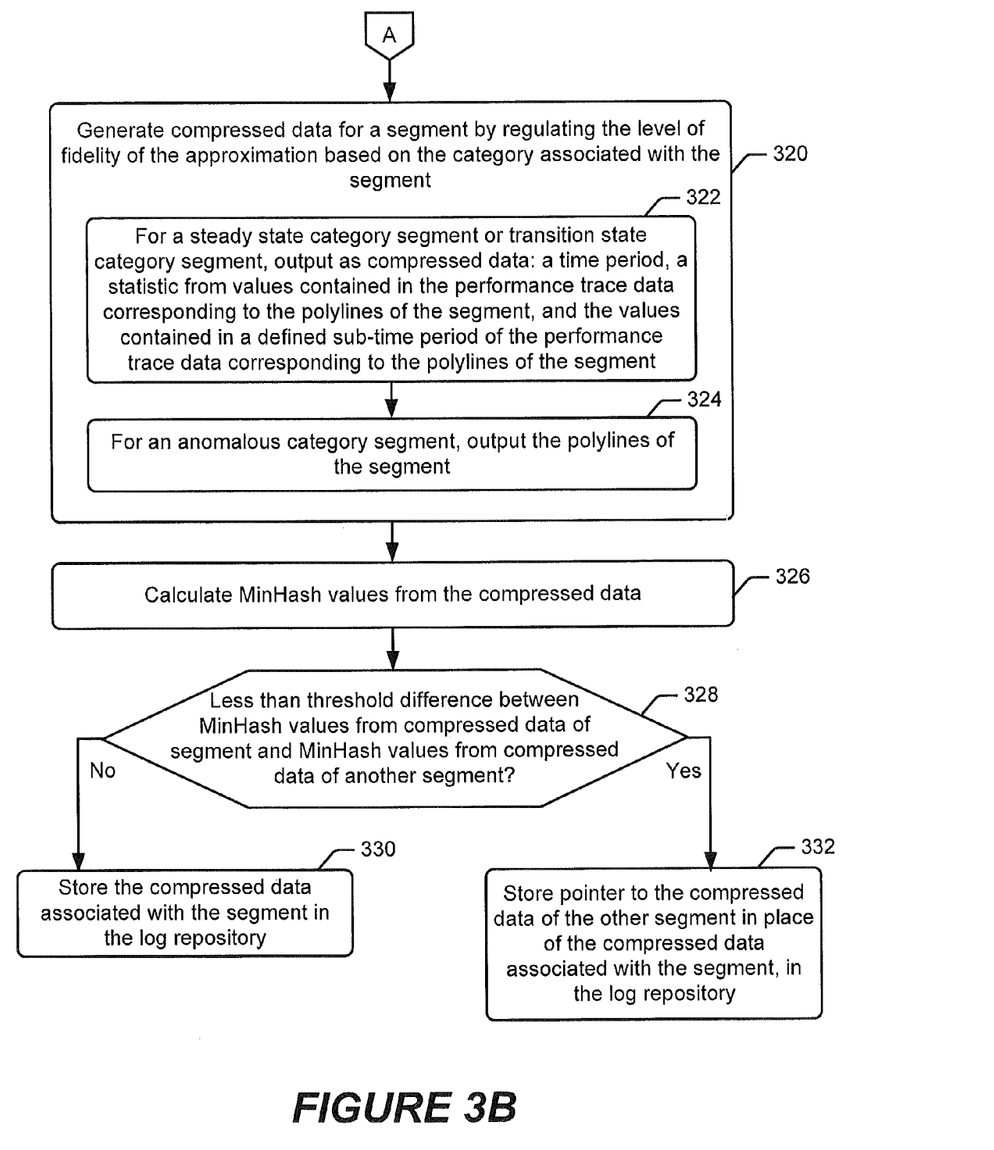

Various operations that can be performed by a trace compression engine 120 to generate the compressed data approximations of values contained in the performance trace data in accordance with various embodiments herein are shown in FIGS. 2 and 3A-3B.

Referring to FIG. 2, the trace compression engine 120 generates (block 200) polylines based on a sequence of values contained in performance trace data from a software source on a host machine node 10. The trace compression engine 120 generates (block 202) segments of the polylines, and categorizes (block 204) separate ones of the segments based on patterns of the polylines of the separate ones of the segments. For the separate ones of the segments, the trace compression engine 120 generates (block 206) compressed data that approximates values contained in the performance trace data corresponding to the polylines of the segment while regulating a level of fidelity of the approximations based on the categorization of the segment. The trace compression engine 120 stores (block 208) the compressed data in the log repository 110.

These operations are described in further detail with reference to FIG. 3. The trace compression engine 120 generates (block 300) polylines based on an arriving performance stream time and value pairs, such as an ordered pair <T, V> where T is the timestamp when a value V was observed by a trace generator. Each polyline is a continuous line that includes one or more line segments between defined values of the performance trace data. For example a polyline may include a first segment extending from <T1, V1> to <T2, V2>, an adjacent segment extending from <T2, V2> to <T3, V3>, another adjacent segment extending from <T3, V3> to <T4, V4>, etc.

Each polyline may be generated based on least-squares linear fitting through the sequences of order pairs. The operations may start with one line segment and add as many neighboring ordered pairs as possible until a measured error (between the polyline fit and the ordered pairs of the performance trace data) exceeds a user-specified threshold. The operations then start with a new line. Each line is of the form (y=ax+b). The output polylines can be represented by a series of triples (a, b, t), where t is the time interval. The series of line segments denoted by the triples (called the signature) is stored instead of the ordered pairs. Since the performance trace data can be continuously received in the performance trace stream, the generation of polylines continues with generating the polyline fit as the ordered pairs of the performance trace data arrive.

Figure 4:
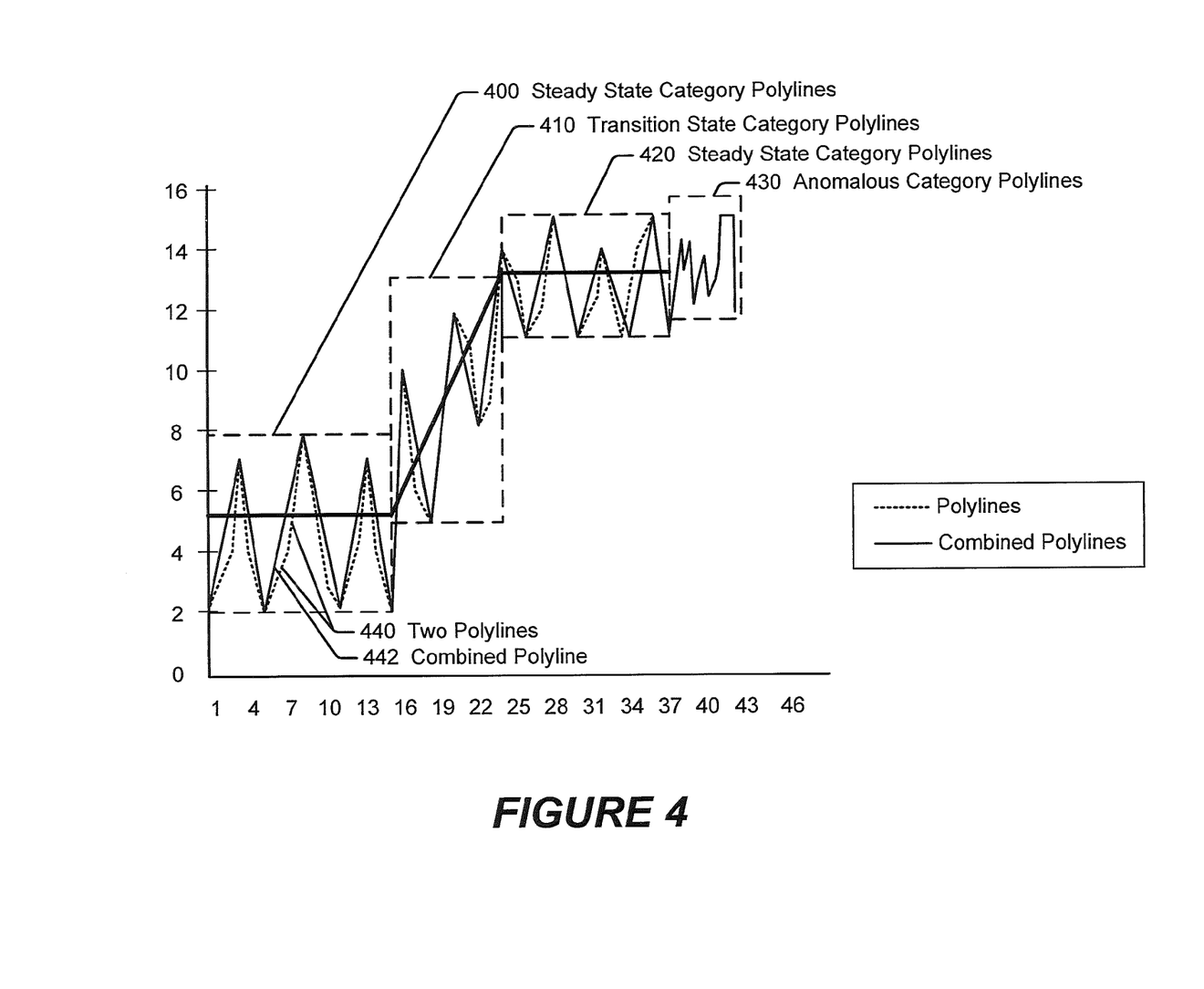
FIG. 4 is a graph illustrating polylines generated from time and value pairs received in trace data and categorized groupings of the polylines in accordance with some embodiments.

FIG. 4 is a graph illustrating polylines 440 as dashed lines that extend between time and value pairs that were received as performance trace data in a performance trace stream.

The polylines are defined to extend between adjacent pairs of the sequence of values contained in the performance trace data. The trace compression engine 120 segments the polylines by combining (block 302) polylines extending between a local minimum value and a local maximum value. All continuous adjacent polylines that are ascending together (e.g., have positive slope) can be combined to generate a polyline extending from the local minimum value to the local maximum value. Similarly all continuous adjacent polylines that are descending together (e.g., have negative slope) can be combined to generate a polyline extending from the local maximum value to the local minimum value.

In other words, the trace compression engine 120 can identify a set of the polylines that extend between a local minimum value and a local maximum value as one of the sequences. For each set of the polylines extending between a local minimum value and a local maximum value of the set, the trace compression engine 120 replaces the polylines of the set with a polyline that extends between the local minimum value and the local maximum value.

Referring to FIG. 4, combined polylines 442 are illustrated as solid lines that extend between the local maximum value and the local minimum value of a set of the polylines 440.

The trace compression engine 120 identifies (block 304) patterns in the combined polylines. In one approach, the patterns are identified based on determining (block 306) a difference between a local minimum and a local maximum of a selected polyline. This difference is compared (block 308) to the difference determined (between the local minimum and maximum) for an adjacent polyline. The selected him adjacent polylines are grouped (block 310) within a same segment if the compared differences satisfy a defined threshold. The defined threshold may correspond to an error value that can be user-defined error and/or statistically derived or determine using a machine-learning algorithm that analyzes previously observed differences and/or other defined relationships between the ordered pairs of performance trace data. The determination of differences and the comparison of differences is repeated for further adjacent polylines until the compared differences the longer satisfying the defined threshold.

A trend line for a group (segment) of polylines can be generated based on an average of values of the polylines within the group. The group (segment) of polylines may be categorized based on the trendline and/or based on other characteristics of the polylines within the group.

The polylines are grouped (segmented) based on comparison of patterns formed by adjacent polylines. Referring to FIG. 3A, the polylines can be categorized (block 312) based on their pattern (e.g., average values of the polylines within a segment).

In one embodiment, adjacent polylines having patterns satisfying a rule of a same category among defined categories are grouped (segmented) into a same segment. Rules of three of the defined categories can include:
1. a steady state category rule satisfied by adjacent polylines having less than a threshold difference between averages of the values of the adjacent polylines;
2. a transition state category rule satisfied by adjacent polylines having average values that follow a trend transitioning from one level of average values of polylines of a previous segment satisfying the steady state category rule to another level of average values of polylines of a next segment satisfying the steady state category rule; and
3. an anomalous state category rule satisfied by adjacent polylines that satisfy neither of the steady state category rule and the transition state category rule.

In performing the categorization, the trace compression engine 120 may associate (block 314) a group (segment) of polylines with a steady state category rule if adjacent polylines of the group have less than a threshold difference between their average values. The trace compression engine 120 may associate (block 316) a group (segment) of polylines with a transition state category rule if adjacent polylines have average values that follow a trend transitioning from one level of average values of polylines of a previous segment that satisfied a steady state category rule, to another level of average values of polylines of a next segment that satisfies the steady state category rule. The trace compression engine 120 may associate (block 318) a group (segment) of polylines with an anomalous state category rule if adjacent polylines have average values that satisfy neither of the steady state category and the transition state category.

The steady state category may correspond to performance trace data that is generated while the software source and/or the host machine node 10 are operating in a steady state. In a steady state, the performance trace data oscillates between minimum and maximum values that have average values that stay roughly the same. The loading or other operational effect on the software source and/or post machine node 10 may cause it to move from one steady state to another. The other steady state would again be characterized by oscillations in the performance trace data between minimum and maximum values that on average remain roughly the same. In the example of FIG. 4, two spaced apart segments 400 and 420 of steady state category polylines are illustrated.

The transition state category may correspond to performance trace data that is generated while the software source and/or the host machine node 10 are changing from one steady state to another, which may be reflected in gradual or a sudden transition of values in the performance trace data. The gradual transition is similar to steady state, but with a trend of increasing (or decreasing) minimum, maximum and average values. In the example of FIG. 4, a segment 410 of transition state category polylines is illustrated.

The anomalous state may correspond to performance trace data that is generated while the software source and/or the host machine node 10 are neither operating in steady state nor transitioning between steady-state, such as while the software source and/or host machine node 10 is operating under an error condition. During the anomalous state the performance trace data may exhibit a short duration period of rapid change in values that do not correspond to expected changes for the software source and/or host machine node 10. This anomalous state can be a cause for concern, because it may indicate that the software source and/or host machine node 10 is operating under a fault or other error condition and/or that they are responding to an unexpected input to their operation. In the example of FIG. 4, a segment 430 of anomalous state category polylines is illustrated.

Referring to the continuing operations shown in FIG. 3B, the trace compression engine 120 generates (block 320) compressed data that approximates values contained in the performance trace data corresponding to the polylines of the segment while regulating a level of fidelity of the approximations based on the categorization of the segment. Because compression rules of been associated with each of the categories, the level of fidelity of the approximation of the values contained in the performance trace data corresponding to the polylines of the segment is regulated based on the rule for the category associated with the segment.

In the embodiment of FIG. 3B, for steady-state category segment or a transition state category segment, the trace compression engine 120 outputs (block 322) one or more of the following as the compressed data: a time period of the performance trace data corresponding to the polylines of the segment; a statistic (e.g., trendline, average, minimum, maximum) from values contained in the performance trace data corresponding to the polylines of the segment; and the values contained in a defined sub-time period of the performance trace data corresponding to the polylines of the segment. Thus, in a defined sub-time of the segment, the actual ordered pairs <T, V> of the performance trace data associated with some of the polylines can be output to the log repository 110.

Storing the ordered pairs in this manner provides increased fidelity in the compressed data and can allow more detailed analysis of the characteristic of the segment of polylines.

In contrast, for an anomalous category segment, the trace compression engine 120 outputs (block 324) the polylines of the segment as the compressed data. Accordingly, when anomalous situations arise the compressed data provides a higher fidelity approximation of the ordered pairs <T, V> of the performance trace data associated with those polylines.

The performance trace data would usually have spaced apart time repetitive patterns, where the cycle period may be hourly, daily or weekly. When the data distribution is time repetitive, increase data compression can be obtained without sacrificing fidelity by storing the compressed data for only the first cycle and subsequently storing pointers to the compressed data of the first cycle when the data distribution is determined to have repeated. The performance trace data may be segmented based on a user-defined time period basis and/or based on a statistically determined time period basis.

In the embodiment of FIG. 3B, the trace compression engine 120 calculates a min-wise independent permutation locality sensitive hashing (MinHash) of the compressed data within each time period. A Jaccard similarity coefficient can be determined between the compressed data from two time periods using the similarity between the min-Hash values generated from the compressed data for the two time periods. For example, when the MinHash of a current time period Tcurr matches the MinHash of any previous time period Tprev within a defined difference there, the trace compression engine 120 uses a pointer to the compressed data of the previous time period Tprev as the compressed data stored for the current time period Tcurr.

In a further embodiment, for each of the segments, Min-Hash values are calculated from the compressed data for the segment. Based on identifying less than a threshold difference between the MinHash values calculated from the compressed data of two of the segments, the compressed data for one of the two segments is replaced with a pointer to the compressed data of the other one of the two segments.

In a related further embodiment, the operations of blocks 300-326 are repeated for other performance trace data from another software source on the host machine node or another host machine node. Based on identifying less than a threshold difference between the MinHash values calculated from the compressed data of a selected one of the segments from both of the software sources, the compressed data for the selected one of the segments of one software source is replaced with a pointer to the compressed data of the selected one of the segments of the other software source.

Use of the MinHash values in the manner to compare similarities between compressed data different segments and make responsive pointer substitutions can provide a computationally efficient approach to substantially decrease the volume of data stored in the log repository 110. Significant compression may be obtained when the software sources and/or host machine nodes 10 are operating in steady state.

Although various embodiments have been described herein in the context of the data compression being performed by a performance trace computer 100 (i.e., the trace compression engine 120 therein) that is separate from the host machine node 10 which is source of the performance trace stream, in some other embodiments the performance trace computer 100 is combined with (e.g., performed by) the host machine node 10. When combined, the compressed data can be communicated from the host machine node 10 for storage in the log repository 110, which can decrease utilization of the connecting data network(s) and reduce/eliminate the need for a separate trace data buffer 102.

Example Log Stream Analysis Computer

Figure 5:
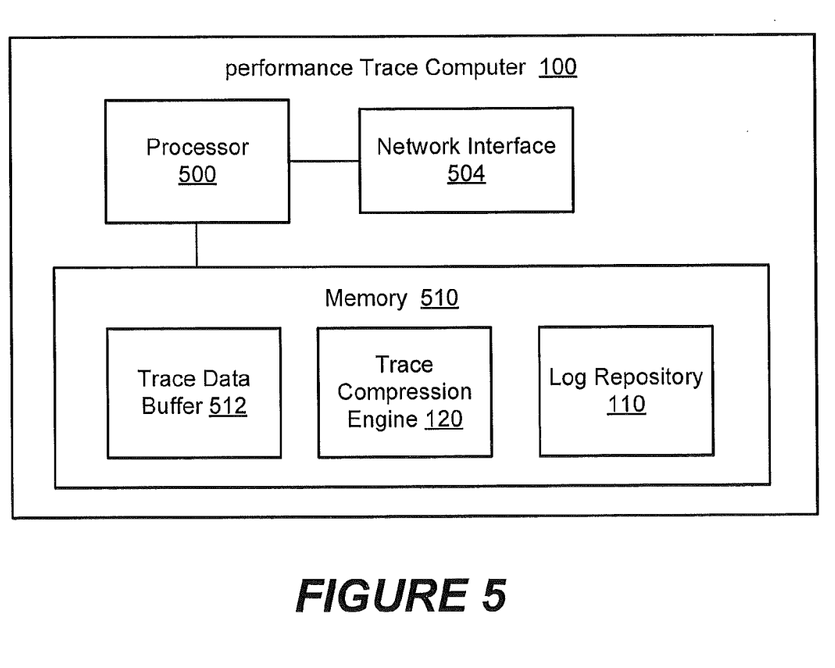
FIG. 5 is a block diagram of a performance trace computer configured according to some embodiments.

FIG. 5 is a block diagram of the performance trace computer 100 or a component thereof that is configured according to one embodiment. Referring to FIG. 5, a processor 500 may include one or more data processing circuits, such as a general purpose and/or special purpose processor (e.g., microprocessor and/or digital signal processor) that may be collocated or distributed across one or more networks. The processor 500 is configured to execute computer readable program code in a memory 510, described below as a computer readable medium, to perform some or all of the operations and methods disclosed herein for one or more of the embodiments. The program code can include the trace compression engine 120 that is configured to perform one or more of the embodiments disclosed herein. The memory 510 can include storage for the trace data buffer 512 and the log repository 110. Although a single memory block 510 has been illustrated for simplicity, it is to be understood that any number, combination of types, and hierarchy of memory storage devices (e.g., solid state, disk drive, etc.) can be used. A network interface 504 can communicatively connect the processor 500 to the host machine nodes 10 and may further communicatively connect to the trace analysis computer 130 shown in FIG. 1.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a computer comprising:
    generating polylines based on a sequence of values contained in performance trace data from a software source on a host machine node;
    generating segments of the polylines;
    categorizing separate ones of the segments based on patterns of the polylines of the separate ones of the segments;
    for the separate ones of the segments, generating compressed data that approximates values contained in the performance trace data corresponding to the polylines of the segment while regulating a level of fidelity of the approximations based on the categorization of the segment; and
    storing the compressed data in a log repository.

2. The method of claim 1, wherein the generating polylines comprises:
    defining polylines extending between adjacent pairs of the sequence of values contained in the performance trace data;
    identifying a set of the polylines that extend between a local minimum value and a local maximum value as one of the sequences; and
    for each set of the polylines extending between a local minimum value and a local maximum value of the set, replacing the polylines of the set with a polyline that extends between the local minimum value and the local maximum value.

3. The method of claim 1, wherein the generating segments of the polylines comprises segmenting the polylines based on a defined time period.

4. The method of claim 1, wherein the generating segments of the polylines comprises segmenting the polylines based on comparison of patterns formed by adjacent polylines.

5. The method of claim 4, wherein the segmenting the polylines based on comparison of patterns formed by adjacent polylines, comprises:
    grouping into a same one of the segments adjacent polylines having patterns satisfying a rule of a same category among defined categories.

6. The method of claim 5, wherein rules of three of the defined categories comprise:
    a steady state category rule satisfied by adjacent polylines having less than a threshold difference between averages of the values of the adjacent polylines;
    a transition state category rule satisfied by adjacent polylines having average values that follow a trend transitioning from one level of average values of polylines of a previous segment satisfying the steady state category rule to another level of average values of polylines of a next segment satisfying the steady state category rule; and
    an anomalous state category rule satisfied by adjacent polylines that satisfy neither of the steady state category rule and the transition state category rule.

7. The method of claim 1, wherein the categorizing separate ones of the segments comprises:
    for each of the segments, categorizing the segment based on comparison of the polylines of the segment.

8. The method of claim 7, wherein the categorizing the segment based on comparison of the polylines of the segment, comprises:
    selecting a category among defined categories to be associated with the segment based on the pattern of the polylines of the segment satisfying a rule for the category.

9. The method of claim 8, wherein the generating compressed data, comprises regulating the level of fidelity of the approximation of the values contained in the performance trace data corresponding to the polylines of the segment based on the rule for the category associated with the segment.

10. The method of claim 9, wherein the generating compressed data comprises:
    outputting as the compressed data for separate ones of the segments that satisfy a rule of one of the categories, a time period of the performance trace data corresponding to the polylines of the segment, a statistic from values contained in the performance trace data corresponding to the polylines of the segment, and the values contained in a defined sub-time period of the performance trace data corresponding to the polylines of the segment; and
    outputting as the compressed data for separate ones of the segments that satisfy a rule of another one of the categories, the polylines of the segment.

11. The method of claim 9, further comprising:
    for each of the segments, calculating min-wise independent permutation locality sensitive hashing (MinHash) values from the compressed data for the segment; and
    based on identifying less than a threshold difference between the MinHash values calculated from the compressed data of two of the segments, replacing the compressed data for one of the two segments with a pointer to the compressed data of the other one of the two segments.

12. The method of claim 11, further comprising:
    repeating the generating polylines, the generating segments, the categorizing separate ones of the segments, the generating compressed data, the storing the compressed data, and the calculating MinHash values for other performance trace data from another software source on the host machine node or another host machine node; and
    based on identifying less than a threshold difference between the MinHash values calculated from the compressed data of a selected one of the segments from both of the software sources, replacing the compressed data for the selected one of the segments of one software source with a pointer to the compressed data of the selected one of the segments of the other software source.

13. A computer program product comprising:
    a non-transitory computer readable storage medium having computer readable program code embodied therewith, the computer readable program code comprising:
        computer readable program code to generate polylines based on a sequence of values contained in performance trace data from a software source on a host machine node;
        computer readable program code to generate segments of the polylines;
        computer readable program code to categorize separate ones of the segments based on patterns of the polylines of the separate ones of the segments;
        computer readable program code to, for the separate ones of the segments, generate compressed data that approximates values contained in the performance trace data corresponding to the polylines of the segment while regulating a level of fidelity of the approximations based on the categorization of the segment; and
        computer readable program code to store the compressed data in a log repository.

14. The computer program product according to claim 13, wherein the computer readable program code to generate segments of the polylines comprises computer readable program code to:
- define polylines extending between adjacent pairs of the sequence of values contained in the performance trace data;
- identify a set of the polylines that extend between a local minimum value and a local maximum value as one of the sequences; and
- for each set of the polylines extending between the local minimum value and the local maximum value of the set, replace the polylines of the set with a polyline that extends between the local minimum value and the local maximum value.

15. The computer program product according to claim 13, wherein the computer readable program code to generate polylines comprises computer readable program code to:
- group into a same one of the segments adjacent polylines having patterns satisfying a rule of a same category among defined categories.

16. The computer program product according to claim 15, wherein rules of three of the defined categories comprise:
- a steady state category rule satisfied by adjacent polylines having less than a threshold difference between averages of the values of the adjacent polylines;
- a transition state category rule satisfied by adjacent polylines having average values that follow a trend transitioning from one level of average values of polylines of a previous segment satisfying the steady state category rule to another level of average values of polylines of a next segment satisfying the steady state category rule; and
- an anomalous state category rule satisfied by adjacent polylines that satisfy neither of the steady state category rule and the transition state category rule.

17. The computer program product according to claim 13, wherein the computer readable program code to categorize separate ones of the segments comprises:
- computer readable program code to, for each of the segments, selecting a category among defined categories to be associated with the segment based on the pattern of the polylines of the segment satisfying a rule for the category.

18. The computer program product according to claim 17, wherein the computer readable program code to generate compressed data, comprises:
- computer readable program code to regulate the level of fidelity of the approximation of the values contained in the performance trace data corresponding to the polylines of the segment based on the rule for the category associated with the segment.

19. The computer program product according to claim 17, wherein the computer readable program code to generate compressed data comprises:
- computer readable program code to output as the compressed data for separate ones of the segments that satisfy a rule of one of the categories, a time period of the performance trace data corresponding to the polylines of the segment, a statistic from values contained in the performance trace data corresponding to the polylines of the segment, and the values contained in a defined sub-time period of the performance trace data corresponding to the polylines of the segment; and
- computer readable program code to output as the compressed data for separate ones of the segments that satisfy a rule of another one of the categories, the polylines of the segment.

20. The computer program product according to claim 17, further comprising:
- computer readable program code to, for each of the segments, calculate min-wise independent permutation locality sensitive hashing (MinHash) values from the compressed data for the segment; and
- computer readable program code to, based on identifying less than a threshold difference between the MinHash values calculated from the compressed data of two of the segments, replace the compressed data for one of the two segments with a pointer to the compressed data of the other one of the two segments.

* * * * *